US008469459B2

(12) United States Patent  (10) Patent No.: US 8,469,459 B2
Lauffer  (45) Date of Patent: Jun. 25, 2013

(54) WHEEL ORNAMENT RETENTION SYSTEM

(75) Inventor: Scott J. Lauffer, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 12/465,838

(22) Filed: May 14, 2009

(65) Prior Publication Data

US 2010/0072806 A1  Mar. 25, 2010

(51) Int. Cl.
B60B 7/08 (2006.01)
B60B 7/10 (2006.01)

(52) U.S. Cl.
USPC .................................. 301/37.373; 301/37.102

(58) Field of Classification Search
USPC ............... 301/35.625, 37.101, 37.102, 37.26, 301/37.27, 37.372, 37.373, 37.376, 37.42, 301/108.1, 108.3
See application file for complete search history.

(56) References Cited

U.S. PATENT DOCUMENTS

| | | | |
|---|---|---|---|
| 4,382,635 A * | 5/1983 | Brown et al. | 301/37.35 |
| 4,842,339 A * | 6/1989 | Roulinson | 301/37.371 |
| 5,297,854 A | 3/1994 | Nielsen et al. | 301/37.37 |
| 6,022,081 A * | 2/2000 | Hauler et al. | 301/37.373 |
| 6,238,007 B1 | 5/2001 | Wieczorek et al. | 301/37.31 |
| 6,325,461 B1 * | 12/2001 | Hauler | 301/37.372 |
| 6,457,781 B1 | 10/2002 | Cutcher et al. | 301/37.371 |
| 6,585,330 B2 * | 7/2003 | Bruce | 301/37.372 |
| 6,682,151 B1 * | 1/2004 | Van Houten et al. | 301/37.373 |
| 6,953,226 B2 * | 10/2005 | Bruce et al. | 301/37.373 |
| 7,108,334 B2 * | 9/2006 | Bruce | 301/37.373 |
| 2003/0090143 A1 | 5/2003 | Bruce | 301/108.4 |
| 2005/0073192 A1 | 4/2005 | Bruce et al. | 301/37.373 |
| 2007/0007816 A1 * | 1/2007 | Willmer | 301/37.373 |

* cited by examiner

Primary Examiner — Kip T Kotter
(74) Attorney, Agent, or Firm — L.C. Begin & Associates, PLLC

(57) ABSTRACT

A system for securing a wheel cover on a vehicle wheel assembly. The system includes first and second bearing surfaces on the wheel cover which are simultaneously engageable by a portion of the vehicle. At least one of the first bearing surface and the second bearing surface is located on a resiliently deflectable portion of the wheel cover. At least one of the first bearing surface and the second bearing surface is also being sloped with respect to an axis along which the wheel cover is applied to the wheel to secure the wheel cover on the wheel assembly, so as to enable slidable engagement between the sloped bearing surface and the portion of the vehicle engaged by the sloped bearing surface. At least one retention surface separate from the sloped surface is engageable with a portion of the vehicle to retain the wheel cover on the wheel assembly.

16 Claims, 4 Drawing Sheets

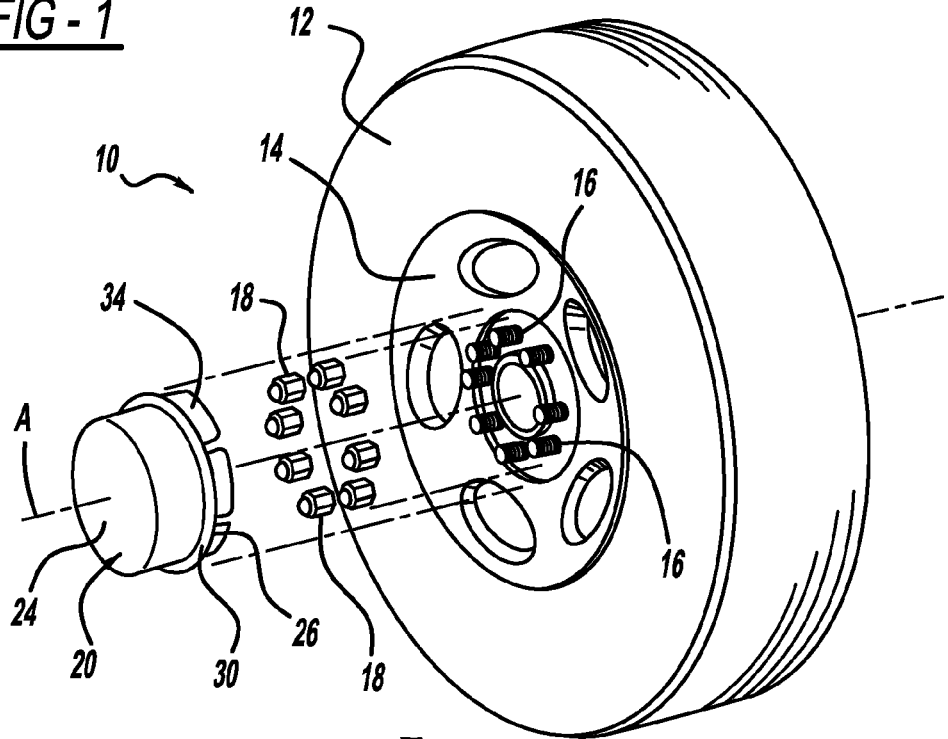
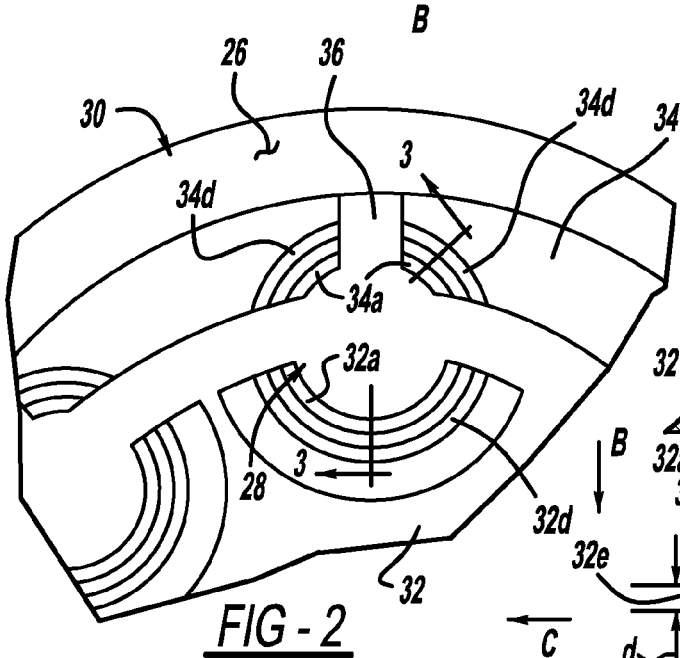
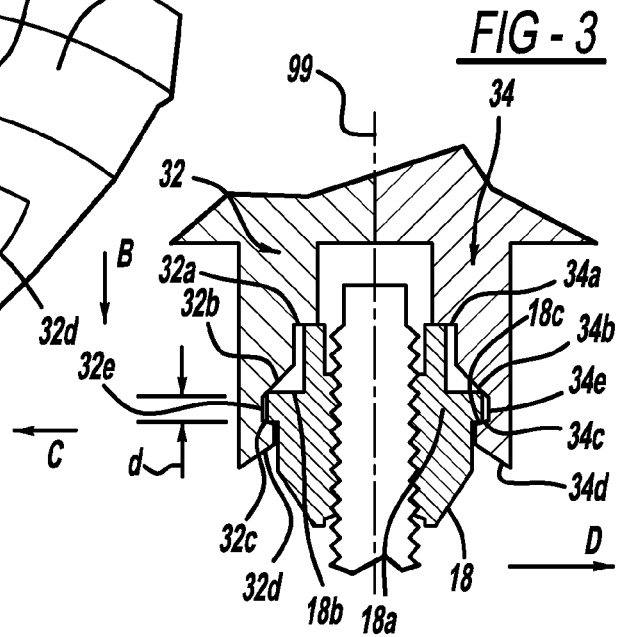

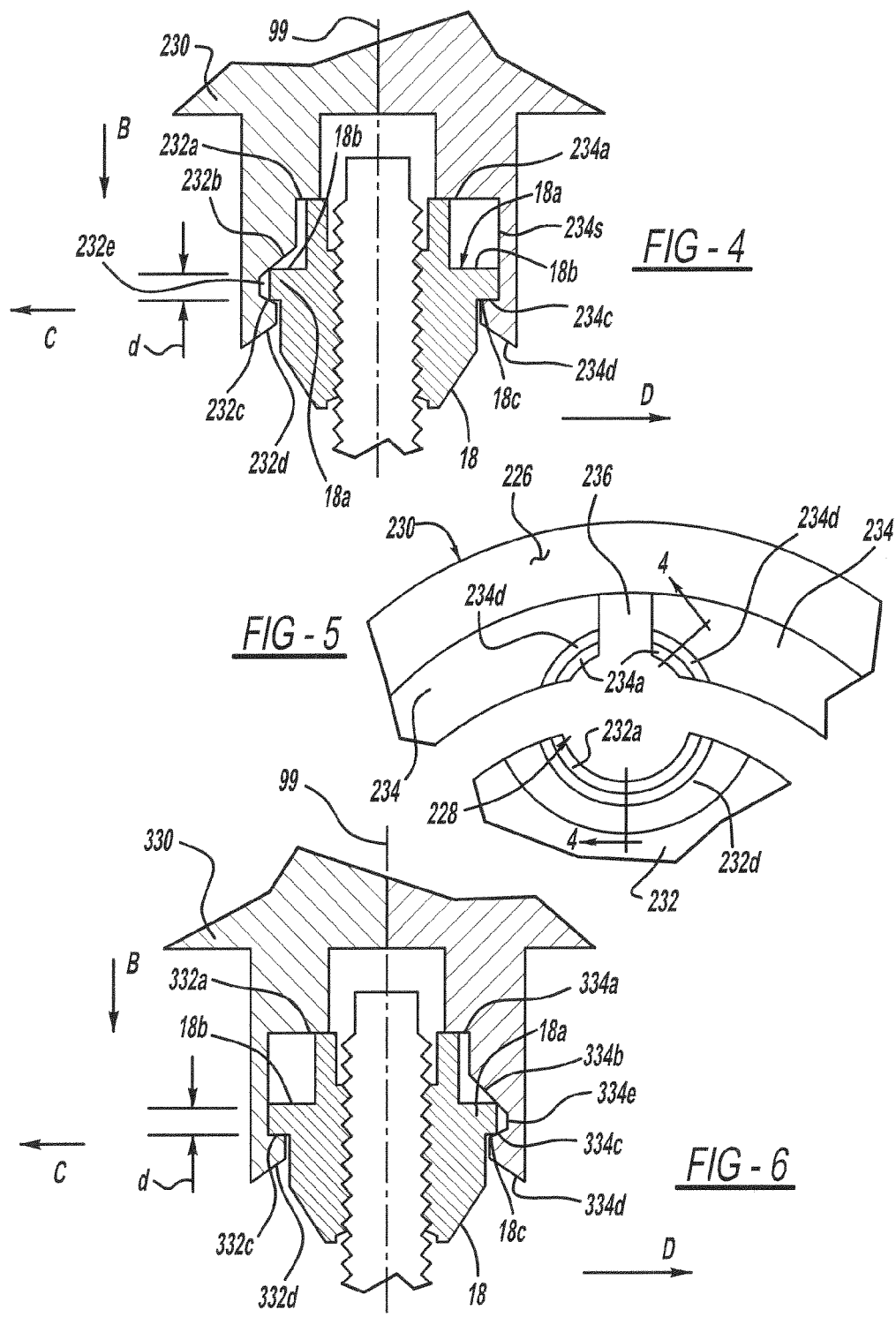

WHEEL ORNAMENT RETENTION SYSTEM

BACKGROUND OF THE INVENTION

The embodiments of the present invention generally relate to ornamental or decorative wheel trim components for use on vehicle wheels. More particularly, the embodiments of the present invention relate to a retention structure for holding a wheel cover to a vehicle wheel having lug nuts.

Decorative or ornamental wheel covers may be attached to lug nuts on vehicle wheels using retention features formed on the wheel cover. Such wheel covers may be formed from a platable or surface-treatable polymeric material. However, heat generated by rotation of the wheel may be transmitted to the lug nuts, and from the lug nuts to the polymeric wheel cover. This heat may produce thermally-induced stress relaxation in the polymeric material, possibly resulting in loss of wheel cover retention force and a loosening of the wheel cover attachment to the wheel. In addition, component dimensional variations and part tolerance stack-ups may act to create undesirable clearances between portions of the wheel cover and the wheel. These factors can enable portions of the wheel cover to move with respect to the wheel during use, resulting in undesirable noise and vibration.

SUMMARY OF THE INVENTION

In one aspect of the embodiments of the present invention, a system is provided for securing a wheel cover on a wheel assembly of a vehicle. The system includes a first bearing surface on the wheel cover, the bearing surface being engageable by a portion of the vehicle. A second bearing surface is also on the wheel cover and is engageable by a portion of the vehicle simultaneously with the first bearing surface. At least one of the first bearing surface and the second bearing surface is located on a resiliently deflectable portion of the wheel cover. At least one of the first bearing surface and the second bearing surface is sloped with respect to an axis along which the wheel cover is applied to the wheel to secure the wheel cover on the wheel assembly, so as to enable slidable engagement between the at least one sloped bearing surface and the portion of the vehicle engaged by the at least one sloped bearing surface. At least one retention surface is engageable with a portion of the vehicle to retain the wheel cover on the wheel assembly. The at least one retention surface is separate from the at least one sloped bearing surface.

In another aspect of the embodiments of the present invention, a system is provided for securing a wheel cover on a wheel assembly of a vehicle. The system includes means for retaining the wheel cover on the wheel assembly, and means separate from the retaining means for applying a force to a portion of the vehicle while the wheel cover is retained on the wheel assembly to prevent relative movement between the wheel cover and a wheel of the wheel assembly. The force-applying means includes at least one resiliently deflectable means for engaging a portion of the vehicle, and at least one sloped surface for engaging a portion of the vehicle.

In another aspect of the embodiments of the present invention, a wheel cover for attachment to a vehicle wheel assembly is provided. The wheel cover includes at least one retention surface engageable with a portion of the vehicle to retain the wheel cover on the wheel assembly, and a cavity defined by the wheel cover for receiving a portion of the vehicle therein. The cavity is resiliently expandable responsive to insertion of the portion of the vehicle into the cavity. The cavity includes therein at least one sloped bearing surface separate from the at least one retention surface, for engaging the portion of the vehicle when the wheel cover is attached to the wheel assembly. The cavity also includes at least one resiliently deflectable wheel cover portion separate from the at least one retention surface for engaging the portion of the vehicle when the wheel cover is attached to the wheel assembly.

BRIEF DESCRIPTION OF THE DRAWINGS

FIG. 1 is a perspective view showing attachment of a wheel cover to a wheel in accordance with embodiments of the present invention.

FIG. 2 is a partial plan view of a wheel cover showing positioning and retention features in accordance with an embodiment of the present invention.

FIG. 3 is a partial cross-sectional side view of a wheel cover in accordance with the embodiment shown in FIG. 2.

FIG. 4 is a partial plan view of a wheel cover showing positioning and retention features in accordance with another embodiment of the present invention.

FIG. 5 is a partial cross-sectional side view of a wheel cover in accordance with the embodiment shown in FIG. 4.

FIG. 6 is a partial plan view of a wheel cover showing positioning and retention features in accordance with another embodiment of the present invention.

DETAILED DESCRIPTION

Figure 7:
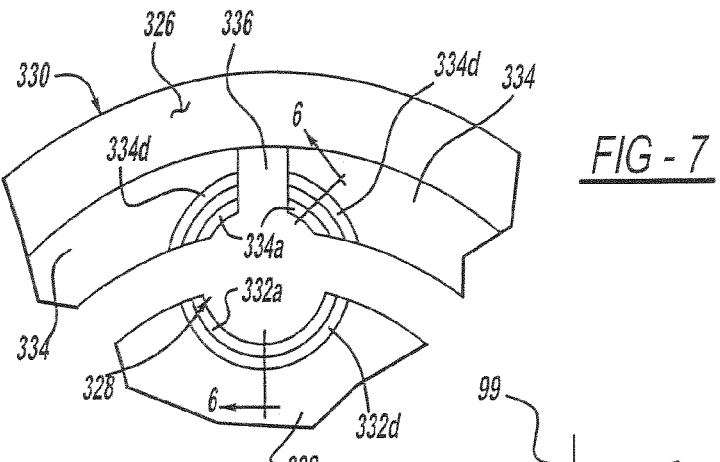
FIG. 7 is a partial cross-sectional side view of a wheel cover in accordance with the embodiment shown in FIG. 6.

FIG. 1 shows a vehicle wheel assembly 10 including a tire 12 and a wheel 14, wherein the wheel 14 is mounted on a vehicle (not shown) using lug studs 16 located on the vehicle. The wheel 14 is secured to the vehicle using lug nuts 18 fastened to the lug studs 16. An ornamental wheel cover 20 covers the wheel 14 according to the embodiments of the present invention described herein. Wheel 14 may be formed from steel, aluminum, or any other suitable metal or alloy. The wheel may chrome plated or otherwise include an outer coating or skin applied to a base material of the wheel. In a manner known in the art, the lug studs 16 are generally uniformly arranged in a circular array centered about a central axis "A" of the wheel assembly 10. The lug nuts 18 are threadingly fastened to the lug studs 16 as is known in the art. The wheel cover 20 attaches directly to the wheel or to another portion of the vehicle to removably cover a portion of the wheel 14 whereby a decorative appearance is provided across the wheel 14, lug nuts 18, and wheel cover 20. In the embodiments disclosed herein, the wheel cover 20 is attached to lug nuts 18. Alternatively, the wheel cover could be attached to another portion of the vehicle or directly to the wheel to cover the wheel.

The wheel cover 20 may be made from any appropriate material (for example, a chrome-platable polymer material such as polycarbonate/acrylonitrile-butadiene-styrene (PC/

ABS)). An outboard face 24 of the wheel cover may be painted or chrome plated for decorative aesthetic appearance. An inboard face 26 is disposed opposite the outboard face 24 and faces the wheel 14 when assembled to the wheel 14.

Referring now to FIGS. 1 and 2, wheel cover 20 includes a base portion 30, a series of first projections 32 extending from inboard face 26 of the base portion and disposed about a center portion of the wheel cover, and a series of second projections 34 extending from the base portion 30 and radially spaced apart from the first projections 32. Gaps 36 are provided between adjacent ones of second projections 34 to facilitate resilient delectability of each individual second projection. Referring to FIG. 2, it is seen that first projections 32 and second projections 34 combine to define a series of cavities or apertures 28 disposed about the center of the wheel cover. More specifically, one of first projections 32 and adjacent pair of second projections 34 combine to define each aperture 28. The apertures 28 are arranged in a circular array that corresponds to the circular array of the lug studs 16 and lug nuts 18 shown in FIG. 1.

In the embodiments described below, at least one of the first projection 32 and the second projections 34 defining any given aperture 28 is resiliently deflectable to facilitate engagement between the projections and an associated lug nut 18 inserted into the aperture. In addition, at least one of the first projection 32 and the second projections 34 defining any given aperture 28 includes one or more sloped surfaces for engaging the associated lug nut 18. The sloped surface(s) are sloped with respect to an axis of insertion 99 of each lug nut into its respective aperture.

FIG. 3 shows a cross-section taken through one of the apertures 28 in a first embodiment of the present invention. FIG. 2 shows a plan view of the aperture shown in FIG. 3. In FIGS. 2 and 3, arrow "C" indicates a direction radially toward a center of the wheel 12, while arrow "D" indicates a direction radially away from the wheel center. As seen in FIGS. 2 and 3, a radially outer face of first projection 32 includes structural elements located therealong and within each of apertures 28 which engage a corresponding one of lug nuts 18 to retain the wheel cover 20 on the wheel assembly. First projection 32 has formed therealong a first shoulder 32a, a sloped surface 32b positioned adjacent the first shoulder 32a, a second shoulder 32c positioned adjacent the sloped portion 32b, and a lead-in surface 32d formed adjacent the second shoulder.

First shoulder 32a functions as a hard stop for limiting axial travel of the wheel cover 20 in the direction indicated by arrow "B" as it is assembled onto wheel 14, to prevent damage to the wheel cover 20. In the embodiments shown in FIGS. 1-9, the hard stop shoulders 32a, 34a, 232a, 234a, 332a, 334a, 532a, 534a, 632a, and 634a are located such that a small clearance exists between each of the shoulders and an associated one of lug nuts 18 when the wheel cover is secured to the wheel. This clearance enables sufficient axial over-travel of the wheel cover during assembly to ensure that the wheel cover retention features (described below) properly engage the flange.

Surface 32b is sloped with respect to an axis 99 along which the wheel cover is applied to the wheel to secure the wheel cover on the wheel assembly. Sloped surface 32b engages lug nut 18 both during assembly of the wheel cover to the wheel assembly and when the wheel cover is in its final attached position. In the embodiment shown in FIGS. 2 and 3, sloped surface 32b engages a flange 18a of the lug nut. However, depending on the design of the lug nut, another portion of the nut may be engaged by the sloped surface 32b.

Lead-in surface 32d slides along an edge of a first side 18b of the lug nut flange 18a during application of the wheel cover to the wheel, causing the end portion of the first projection to resiliently deflect and enabling second shoulder 32c to be inserted past the nut flange so that the second shoulder can engage an opposite side 18c of the nut flange. Second shoulder 32c engages lug nut 18 when the wheel cover 20 is in its final attached position, to secure the wheel cover to the lug nut. In the embodiment shown in FIGS. 2 and 3, second shoulder 32c engages a flange 18a of the lug nut. This engagement of the second shoulder 32c with the opposite side of the nut flange 18 acts to retain the wheel cover 20 on the wheel assembly. However, depending on the design of the lug nut, another portion of the nut may be engaged by the second shoulder 32c or another complementary retention feature formed along the first projection 32, to maintain the wheel cover 20 on the wheel assembly.

It is seen from FIG. 3 that second shoulder 32c and sloped surface 32b combine to define a cavity 32e which gradually narrows in the direction indicated by arrow "C". It is also seen from FIG. 3 that lug nut flange 18a resides within this cavity 32e when the wheel cover 20 has been applied to the wheel. Cavity 32e is dimensioned such that a depth "d" of flange 18a is greater than the narrowest dimension of the cavity. Thus, both second shoulder 32c and sloped surface 32b will be in contact with flange 18a when the wheel cover is assembled to the wheel assembly.

As seen in FIGS. 2 and 3, a radially inward face of each second projection 34 includes structural elements located therealong and within each of apertures 28 which engage lug nut 18 to position and stabilize the wheel cover 20 on the wheel. Second projection 34 includes a first shoulder 34a, a first sloped surface 34b positioned adjacent the first shoulder 34a, a second shoulder 34c adjacent the first sloped surface 34b, and a lead-in surface 34d formed adjacent the second shoulder 34c.

First shoulder 34a functions as a hard stop for limiting axial travel of the wheel cover 20 as it is assembled on the wheel 14, to prevent damage to the wheel cover 20.

First sloped surface 34b is sloped with respect to direction "B" and is engageable with lug nut 18 both during attachment of the wheel cover to the wheel assembly and when the wheel cover is in its final attached position. In the embodiment shown in FIG. 3, first sloped surface 34b engages lug nut flange 18a. However, depending on the design of the lug nut, another portion of the nut may be engaged by the first sloped 34b surface.

Second shoulder 34c is also is engageable with lug nut 18 both during attachment of the wheel cover and when the wheel cover is in its final attached position. In the embodiment shown in FIG. 3, second sloped surface 34c engages lug nut flange 18a. However, depending on the design of the lug nut, another portion of the nut may be engaged by the second shoulder 34c.

In addition, depending on such factors as the particular dimensions of the cover-mounted retention system components and on the depth of lug nut flange 18a, flange 18a may be engaged with only one of surfaces 34b and 34c when second shoulder 32c is engaged with flange 18a and the wheel cover is retained on the wheel assembly.

It is seen from FIG. 3 that first sloped surface 34b and shoulder 34c tend to converge, thereby defining a cavity 34e which gradually narrows in the direction indicated by arrow "D". It is also seen from FIG. 3 that lug nut flange 18a resides within cavity 34e when the wheel cover 20 has been applied to the wheel. Cavity 34e is dimensioned such that the depth d of flange 18a is greater than the narrowest dimension of the cavity. This facilitates contact between flange 18a and at least one of first sloped surface 34b and shoulder 34c when the wheel cover 20 is assembled to the wheel assembly. Furthermore, it is also seen that cavities 34e in second projections 34 reside substantially opposite cavity 32e formed in first projection 32.

Lead-in surface 34d slides along an edge of first side 18b of the lug nut flange 18a during application of the wheel cover to the wheel, causing the end portion of the second projection to resiliently deflect and enabling second shoulder 34c to be inserted past the nut flange 18a so that the second shoulder 34c can engage opposite side 18c of the nut flange. Thus engaged, second shoulder 34c serves a detent function, impeding removal of the wheel cover from the wheel assembly.

Referring to FIGS. 1-3, to attach wheel cover 20 to the wheel assembly, wheel cover apertures 28 are aligned with respective ones of lug nuts 18, and the wheel cover is applied to the wheel in the direction indicated by arrow "B". As the cover is applied to the wheel, each lug nut 18 enters a corresponding aperture 28. As the wheel cover 20 continues to move in direction "B", lead-in surfaces 32d and 34d engage lug nut flange 18a. Continued movement of cover 20 in direction "B" causes the nut flange 18a to ride along the lead-in surfaces 32d and 34d.

In the embodiment shown in FIGS. 2 and 3, first and second projections 32 and 34 defining aperture 28 are resiliently deflectable. Thus, as the nut flange 18a rides along sloped surfaces 32d and 34d, first and second projections 32 and 34 are forced to deflect outward from the lug nut 18. The deflections of first projection 32 and second projections 34 increase as the wheel cover continues to move in direction "B", until first projection second shoulder 32c passes lug nut flange 18a, enabling the second shoulder 32c to snap back to engage the flange opposite side 18c, wherein flange 18a resides in first projection cavity 32e. Similarly, second shoulder 34c snaps back to engage flange opposite side 18c. At this point, flange 18a has also entered second projection cavity 34e opposite first projection cavity 32e.

Because the smallest dimensions of respective cavities 32e and 34e are smaller than the depth "d" of flange 18a, sloped surface 32b and second shoulder 32c of first projection 32 and sloped surfaces 34b and shoulders 34c of second projections 34 remain engaged with lug nut flange 18a, and the wheel cover first and second projections 32 and 34 remain in a slightly deflected state when the wheel cover 20 has been assembled to the wheel assembly. Thus, bearing surfaces 32b, 34b, and 34c of the wheel cover continue to exert forces on the lug nut 18. These forces act to position and stabilize the wheel cover 20 in its mounted position on the wheel assembly. It is understood that first projection second shoulder 32c is dimensioned so as to ensure engagement with flange side 18c while flange 18a resides within cavities 32e and 34e, help ensure retention of the wheel cover to the lug nuts.

If the wheel cover 20 is forced in the direction "B" a predetermined distance past its designed mounting position, first shoulders 32a and 34a abut a surface of lug nut 18 as shown in FIG. 3, thereby preventing further travel in direction "B" which may damage the wheel cover.

The wheel cover 20 may be removed from the lug nuts 18 by inserting a tool (not shown) between the wheel cover 20 and the wheel 14 to pry the wheel cover 20 off the wheel without accessing the lug nuts. Portions of first projection(s) 32, and/or portions of second projections 34 are engaged and deflected by the tool so as to disengage the retention shoulder(s) 32c from the lug nut, thereby enabling removal of the wheel cover from the wheel.

Due to the sloped surface (or surfaces) formed along the portions of the wheel cover 20, the dimensioning of any cavities formed by converging bearing surfaces such as 34b and 34c, and the resilient deflectability of the first and second wheel cover projections 32 and 34, the above-described contact between the wheel cover surfaces and the lug nuts can be achieved and maintained over a wide range of component dimensional variation and part tolerances.

In the embodiments described herein, each lug nut essentially becomes wedged between wheel cover bearing surfaces, which are separate from the wheel cover retention features. At least one of the bearing surfaces engaging the lug nut is sloped with respect to the direction or axis of application of the wheel cover to the wheel. Also, at least one of the bearing surfaces engaging the lug nut is located on a resiliently deflectable member or projection of the wheel cover. The elements of the wheel cover retention system are dimensioned so that one or more of any resiliently deflectable projections will be in a deflected state when the wheel cover is retained on the wheel assembly (i.e., the cavity formed by the first and second projections is dimensioned such that a resilient interference fit is created between the cavity walls and the portion of the vehicle inserted into the cavity). The resulting resilient positive engagement between the wheel cover surfaces and the lug nuts and the forces generated by this engagement aid in positioning and securing wheel cover 20 on the wheel, in preventing rattling and noise due to gaps or play between portions of the wheel cover and its attachment points to the wheel, and in preventing relative motion between the wheel cover and the wheel.

After the retention shoulder has been engaged with the nut flange to retain the wheel cover to the wheel, the retention system will seek a configuration having the lowest potential energy. That is, the deflected elements of the system will tend to return to an undeflected state and elements of the system in contact with the lug nut will tend to adjust their positions so as to relieve or reduce any forces applied thereto. Thus, the positions of the first and second projections relative to the lug nut may "self-adjust" to reduce the energy stored in the system while contact between the lug nut and the wheel cover elements is still maintained. This helps take up any slack or play between the wheel cover bearing surfaces and the lug nut.

In addition, because at least one of the wheel cover surfaces engaging the lug nut is sloped with respect to the axis of application of the wheel cover to the wheel, the sloped engagement surface will continue to engage the lug nut even if a deflectable member pushing on the lug nut experiences a degree of stress relaxation. Stated another way, the portion of the lug nut engaged by the sloped bearing surface(s) will "slide along" the bearing surface(s) as stress relaxation occurs. Thus, bearing forces will always act on the lug nut to help position, stabilize, and secure the wheel cover on the wheel.

Referring now to FIGS. 4 and 5, in another embodiment similar to the embodiment shown in FIGS. 2 and 3, a first projection 232 includes a shoulder 232a, converging sloped surfaces 232b and 232c as formed along second projections 34 in FIGS. 2 and 3, and a lead-in surface 232d. Second projections 234 each include a first shoulder 234a, a straight bearing surface 234s abutting the lug nut flange 18a, a second shoulder 234c for retaining the wheel cover to the wheel assembly as previously described, and a lead-in surface as previously described. In this embodiment, lug nut flange 18a is engaged by a single pair of sloped surfaces 232b and 232c, straight bearing surface 234s, and second shoulders 234c on second projections 234 retain the wheel cover 220 on the wheel. Forces exerted in direction C by resilient second projections 234 will tend to move the wheel cover in an opposite as direction indicated by arrow D. The resultant forces tend to increase the contact force between the lug nut 18 and first projection 232.

Referring to FIGS. 6 and 7, in yet another embodiment, a first projection 332 includes a first shoulder 332a, a second shoulder 332c, and a lead-in surface 332d as previously described, while one or more of second projections 334 include the features appealing on the second projections 34 shown in FIGS. 2 and 3 as previously described.

Figure 10:
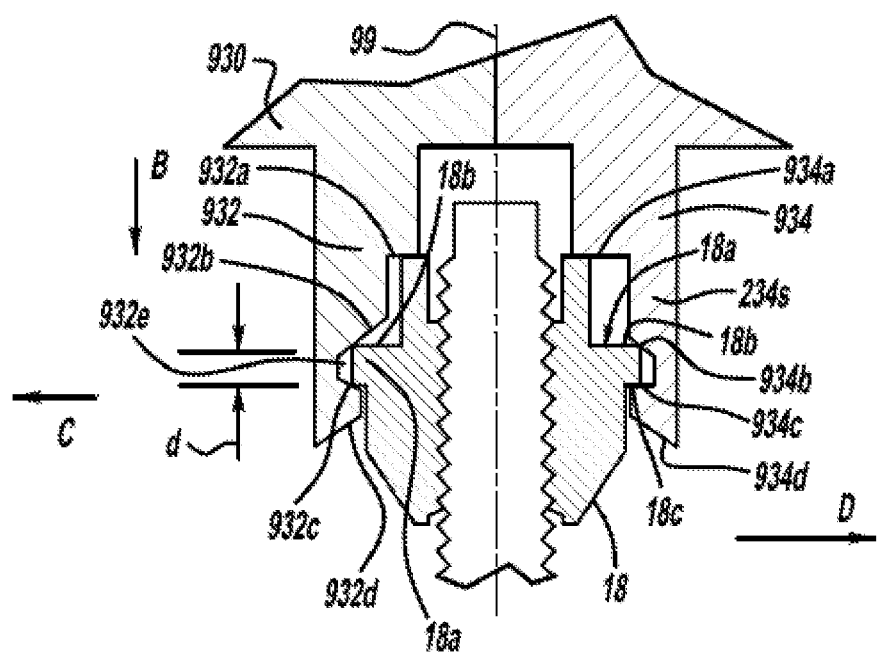
FIG. 10 is a partial cross-sectional side view of a wheel cover including a wheel cover retention system in accordance with another embodiment of the present invention.

FIG. 10 shows an alternative embodiment in which a sloped bearing surface 932b is formed along a substantially non-deflectable first projection 932 and additional sloped bearing surfaces 934b are formed along resiliently deflectable second projections 934. A shoulder 932a and a lead-in surface 932d as described with regard to other embodiments are provided. Second projections 934 each include a first shoulder 934a, a second shoulder 934c for retaining the wheel cover to the wheel assembly as previously described, and a lead-in surface 934d as previously described. In this embodiment, lug nut flange 18a is engaged by sloped surfaces 932b and 934b and second shoulders 932c on first projection 932 and 934c on second projections 934 retain the wheel cover 220 on the wheel.

Figure 11:
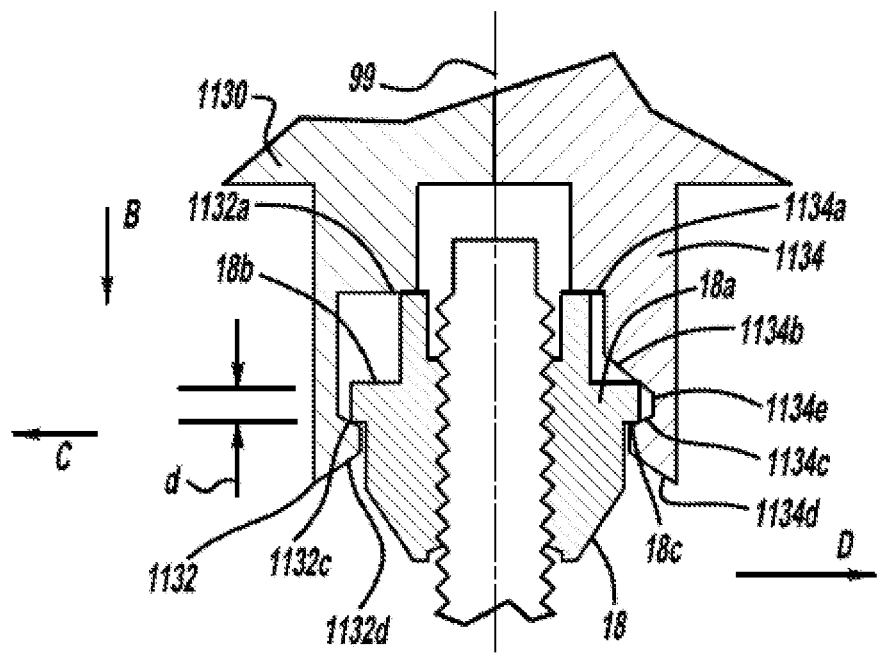
FIG. 11 is a partial cross-sectional side view of a wheel cover including a wheel cover retention system in accordance with another embodiment of the present invention.

Referring now to FIG. 11, in another embodiment, a resiliently deflectable first projection 1132 includes a shoulder 1132a, a sloped surface 1132c, and a lead-in surface 1132d. Second projections 1134 each include a first shoulder 1134a, a sloped surface 1134c to aid in retaining the wheel cover to the wheel assembly, and a lead-in surface 1134d as previously described. In this embodiment, lug nut flange 18a is engaged by a pair of converging sloped surfaces 1134b and 1134c formed on each second projection 1134, and second shoulders 1134c on second projections 1134 help retain the wheel cover on the wheel. Forces exerted in direction D by resilient first projection 1132 will tend to wedge lug nut flange 18a between sloped surfaces 1134b and 1134c.

It will be appreciated that any of the bearing surfaces (whether sloped of straight) may be formed on a resiliently deflectable projection or on a relatively rigid or substantially non-deflectable projection.

Figure 8:
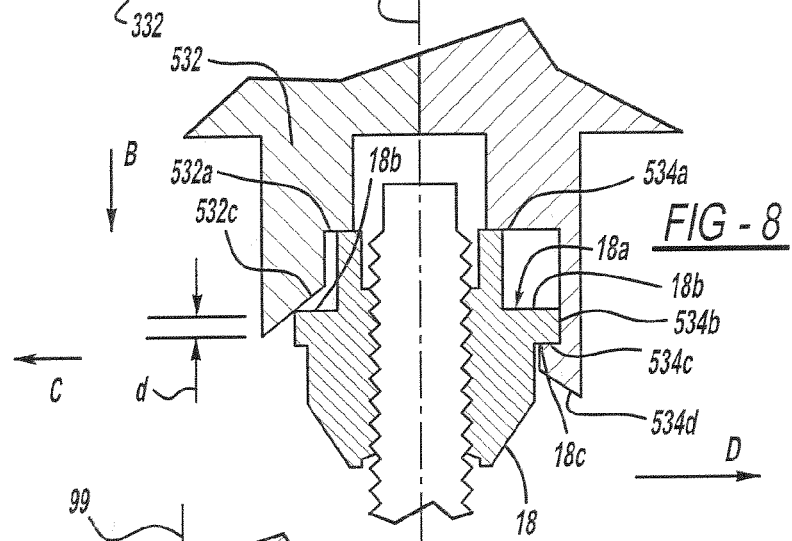
FIG. 8 is a partial cross-sectional side view of a wheel cover including a wheel cover retention system in accordance with another embodiment of the present invention.
Figure 9:
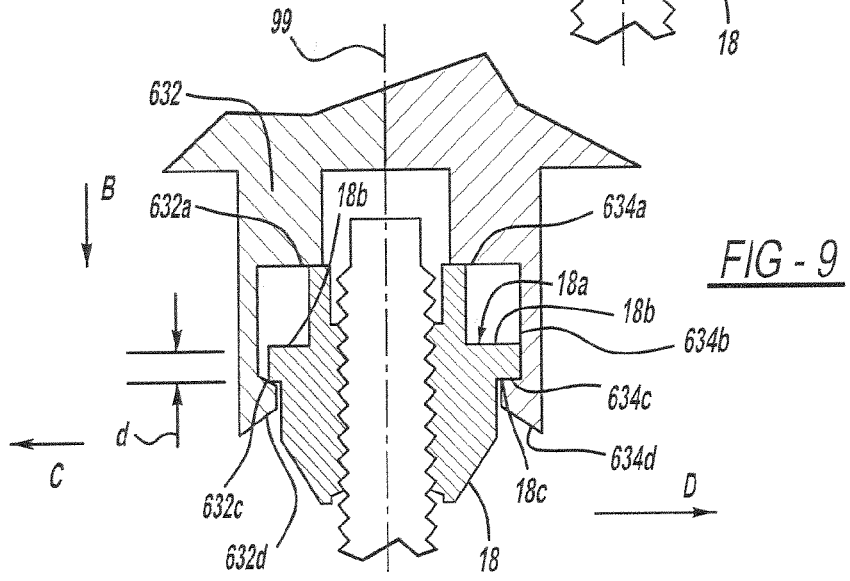
FIG. 9 is a partial cross-sectional side view of a wheel cover including a wheel cover retention system in accordance with another embodiment of the present invention.

FIGS. 8 and 9 show additional embodiments. The embodiment shown in FIG. 8 includes a first projection 532 and a pair of second projections 534 (one of which is not visible in FIG. 8). First projection 532 includes a shoulder 532a and a single sloped bearing surface 532c engaged with a lug nut flange 18a. Each of second projections 534 has a bearing surface 534c and a lead-in surface 534d. The embodiment shown in FIG. 9 includes a first projection 632 and a pair of second projections 634 (one of which is not visible in FIG. 9). First projection 632 includes a shoulder 632a and a lead-in surface 632d. Each of second projections 634 includes a first shoulder 634a, a retention surface 634c, and a lead-in surface 634d. Bearing surface 534b in FIG. 8 and bearing surface 634b in FIG. 9 are formed along respective resiliently deflectable projections.

Referring now to FIGS. 10 and 11, in another embodiment, a resiliently deflectable first projection 732 includes a first shoulder 732a, a sloped surface 732b positioned adjacent the first shoulder 732a, a second shoulder 732c positioned adjacent the sloped portion 732b, and a lead-in surface 32d formed adjacent the second shoulder. The embodiment shown in FIGS. 10 and 11 also includes relatively rigid second projections 734. A radially inward face of each second projection 734 includes structural elements located thereaolong and within each of apertures 728 which engage lug nut 18 to position and stabilize the wheel cover 720 on the wheel. Second projection 734 includes a first shoulder 734a, a first sloped surface 734b positioned adjacent the first shoulder 734a, a second shoulder 734c adjacent the first sloped surface 734b, and a lead-in surface 734d formed adjacent the second shoulder 734c. First shoulders 732a and 734a function as hard stops as previously described. Second shoulder 734c extends along a plane perpendicular to axis 99 and acts as a retention surface for retaining lug nut 18 within wheel cover cavity 728. In addition, assembly of the wheel cover to the wheel in the embodiment shown in shown in FIGS. 10 and 11 is similar to that of the embodiment shown in FIGS. 2 and 3, except that first projection 732 is resiliently deflectable while second projections 734 are relatively rigid. Thus, during assembly of the wheel cover on the wheel, first projection 732 will resiliently deflect as previously described, while relatively rigid second projections 734 will deflect a relatively much smaller amount (if at all).

In other embodiments (not shown), a retention shoulder is formed on more than one of first and second projections 32 and 34, so that multiple retention shoulders can be engaged with the nut flange to retain the wheel cover to the wheel.

Overall, embodiments of the present invention disclosed herein also include a wheel cover 20 for attachment to a vehicle wheel assembly. The wheel cover includes at least one retention surface engageable with a portion of the vehicle to retain the wheel cover on the wheel assembly, and a cavity 28 defined by the wheel cover for receiving a portion of the vehicle therein. The cavity is resiliently expandable responsive to insertion of a portion of the vehicle into the cavity. The cavity includes therein at least one sloped bearing surface separate from the retention surface for engaging portion of the vehicle when the wheel cover is attached to the wheel assembly, and at least one resiliently deflectable portion separate from the retention surface for engaging the portion of the vehicle when the wheel cover is attached to the wheel assembly.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A system for securing a wheel cover on a wheel assembly of a vehicle, the system comprising:
   a first bearing surface on the wheel cover, said bearing surface being engageable by a portion of the vehicle;
   a second bearing surface on the wheel cover, said bearing surface being engageable by said portion of the vehicle simultaneously with the first bearing surface,
   at least one of the first bearing surface and the second bearing surface being located on a resiliently deflectable portion of the wheel cover,
   at least one of the first bearing surface and the second bearing surface being sloped with respect to an axis along which the wheel cover is applied to the wheel to secure the wheel cover on the wheel assembly, so as to enable slidable engagement between the at least one sloped bearing surface and the portion of the vehicle engaged by the at least one sloped bearing surface; and
   at least one retention surface engageable with said portion of the vehicle to retain the wheel cover on the wheel assembly, the at least one retention surface being separate from the at least one sloped bearing surface, wherein said at least one sloped bearing surface is located on a substantially non-deflectable portion of the wheel cover.

2. The system of claim 1 wherein, when the retention surface is engaged with said portion of the vehicle to retain the wheel cover on the wheel, the at least one sloped bearing surface slidably engages said portion of the vehicle, and the resiliently deflectable portion of the wheel cover is in a deflected state.

3. The system of claim 1 wherein, after the retention surface is engaged with said portion of the vehicle to retain the wheel cover on the wheel, the at least one sloped bearing surface is slidable along the portion of the vehicle engaged therewith, so as to reduce a deflection of the resiliently deflectable portion of the wheel cover.

4. The system of claim 1 wherein the other one of the first bearing surface and the second bearing surface is sloped.

5. The system of claim 1 wherein the at least one sloped bearing surface slopes in a direction generally away from the portion of the vehicle which it engages, along a direction of application of the wheel cover to the wheel during securement of the cover on the wheel assembly.

6. The system of claim 1 further comprising a third bearing surface engageable by said portion of the vehicle simultaneously with the first bearing surface and the second bearing surface.

7. The system of claim 6 wherein at least one of the first, second, and third bearing surfaces is located on a substantially non-deflectable portion of the wheel cover.

8. The system of claim 1 wherein at least one of the first and second bearing surfaces is located on a substantially non-deflectable portion of the wheel cover.

9. The system of claim 1 further comprising another sloped bearing surface engageable by said portion of the vehicle, the other sloped bearing surface being positioned adjacent the at least one sloped bearing surface, and wherein the other sloped bearing surface is sloped with respect to the at least one sloped bearing surface such that the other sloped bearing surface and the at least one sloped bearing surface tend to converge when proceeding in a direction generally orthogonal to the axis along which the wheel cover is applied to the wheel.

10. The system of claim 1 wherein the at least one sloped bearing surface slopes in a direction generally toward the axis along which the wheel cover is applied to the wheel.

11. A system for securing a wheel cover on a wheel assembly of a vehicle, the system comprising:
a plurality of bearing surfaces formed on the wheel cover, said bearing surfaces being simultaneously engageable by a portion of the vehicle, the plurality of bearing surfaces including a bearing surface of the plurality of bearing surfaces located on a resiliently deflectable portion of the wheel cover, the plurality of bearing surfaces also including a pair of sloped bearing surfaces located on respective substantially non-deflectable portions of the wheel cover, each of the sloped bearing surfaces being sloped with respect to an axis along which the wheel cover is applied to the wheel to secure the wheel cover on the wheel assembly, so as to enable slidable engagement of the each bearing surface of the pair of sloped bearing surfaces with the portion of the vehicle engaged by each sloped bearing surface; and
at least one retention surface engageable with said portion of the vehicle to retain the wheel cover on the wheel assembly, the at least one retention surface being separate from each of the sloped bearing surfaces.

12. The system of claim 11 wherein the bearing surface located on the resiliently deflectable portion of the wheel cover is sloped with respect to an axis along which the wheel cover is applied to the wheel to secure the wheel cover on the wheel assembly, so as to enable slidable engagement between the sloped bearing surface located on the resiliently deflectable portion of the wheel cover and the portion of the vehicle engaged by the sloped bearing surface located on the resiliently deflectable portion of the wheel cover.

13. A wheel cover for attachment to a vehicle wheel assembly, the wheel cover comprising:
a cavity defined by the wheel cover for receiving a portion of the vehicle therein, the cavity being resiliently expandable responsive to insertion of the portion of the vehicle into the cavity in a first direction, the cavity including therein:
at least one retention surface engageable with said portion of the vehicle responsive to application of a force to the wheel cover in a second direction opposite the first direction to retain the wheel cover on the wheel assembly;
at least one sloped bearing surface separate from the at least one retention surface, for engaging the portion of the vehicle when the wheel cover is attached to the wheel assembly, and
at least one resiliently deflectable wheel cover portion separate from the at least one retention surface for engaging the portion of the vehicle when the wheel cover is attached to the wheel assembly,
wherein a plane extending along the at least one retention surface is perpendicular to an axis along which the wheel cover is applied to the wheel to secure the wheel cover on the wheel assembly.

14. A system for securing a wheel cover on a wheel assembly of a vehicle, the system comprising:
a first bearing surface on the wheel cover, said first bearing surface being engageable by a portion of the vehicle;
a second bearing surface on the wheel cover, said second bearing surface being engageable by the portion of the vehicle simultaneously with the first bearing surface,
at least one of the first bearing surface and the second bearing surface being located on a resiliently deflectable portion of the wheel cover,
at least one of the first bearing surface and the second bearing surface being sloped with respect to an axis along which the wheel cover is applied to the wheel to secure the wheel cover on the wheel assembly, so as to enable slidable engagement between the at least one sloped bearing surface and the portion of the vehicle engaged by the at least one sloped bearing surface; and
at least one retention surface engageable with the portion of the vehicle to retain the wheel cover on the wheel assembly, the at least one retention surface being separate from the at least one sloped bearing surface,
wherein said at least one sloped bearing surface is located on a substantially non-deflectable portion of the wheel cover.

15. The system of claim 14 wherein the at least one retention surface extends perpendicular to an axis along which the wheel cover is applied to the wheel to secure the wheel cover on the wheel assembly.

16. The system of claim 14 wherein one of the first bearing surface and the second bearing surface extends parallel to an axis along which the wheel cover is applied to the wheel to secure the wheel cover on the wheel assembly.

* * * * *